US008932008B2

(12) United States Patent
Boening et al.

(10) Patent No.: US 8,932,008 B2
(45) Date of Patent: Jan. 13, 2015

(54) SECURING ELEMENT AND EXHAUST GAS TURBOCHARGER HAVING VARIABLE TURBINE GEOMETRY

(75) Inventors: Ralf Boening, Reiffelbach (DE); Dirk Frankenstein, Worms (DE); Holger Faeth, Fussgoenheim (DE); Marc Hiller, Morschheim (DE)

(73) Assignee: Continental Automotive GmbH, Hannover (DE)

( * ) Notice: Subject to any disclaimer, the term of this patent is extended or adjusted under 35 U.S.C. 154(b) by 1057 days.

(21) Appl. No.: 12/936,721

(22) PCT Filed: Mar. 13, 2009

(86) PCT No.: PCT/EP2009/053004
§ 371 (c)(1),
(2), (4) Date: Oct. 7, 2010

(87) PCT Pub. No.: WO2009/124824
PCT Pub. Date: Oct. 15, 2009

(65) Prior Publication Data
US 2011/0027074 A1 Feb. 3, 2011

(30) Foreign Application Priority Data
Apr. 8, 2008 (DE) .......................... 10 2008 017 821

(51) Int. Cl.
*F01B 25/02* (2006.01)
*F16B 35/04* (2006.01)
(52) U.S. Cl.
CPC ................................. *F16B 35/041* (2013.01)
USPC .............................. 415/164; 415/155; 415/160

(58) Field of Classification Search
USPC ......... 415/155, 159, 160, 162, 163, 165, 164; 411/424, 916, 8
See application file for complete search history.

(56) References Cited

U.S. PATENT DOCUMENTS

| 4,851,187 | A | 7/1989 | Lippert et al. |
| 4,913,633 | A | 4/1990 | Kraemer et al. |
| 5,380,118 | A | 1/1995 | Stahlecker et al. |
| 6,095,236 | A | 8/2000 | Kuhler |
| 6,145,313 | A | 11/2000 | Arnold |
| 6,896,747 | B2 * | 5/2005 | Hauser et al. ................. 148/327 |
| 6,968,702 | B2 * | 11/2005 | Child et al. ..................... 60/798 |
| 7,189,058 | B2 * | 3/2007 | Metz et al. .................... 415/165 |

(Continued)

FOREIGN PATENT DOCUMENTS

| DE | 3705181 A1 | 9/1988 |
| DE | 3736091 A1 | 5/1989 |

(Continued)

*Primary Examiner* — Edward Look
*Assistant Examiner* — Adam W Brown
(74) *Attorney, Agent, or Firm* — Laurence A. Greenberg; Werner H. Stemer; Ralph E. Locher

(57) ABSTRACT

A securing element includes a head section and a shank. The cross-section of the shank changes in the axial direction in such a way that, by taking into account a qualitative and/or quantitative predetermined bending torque profile in the shank, the cross-section has a substantially uniform bending stress profile in the shank in relation to a securing element with a constant shank cross-section. An exhaust gas turbocharger having variable turbine geometry includes a VTG-guide vane configuration having at least one such securing element and being secured to a housing component of the exhaust gas turbocharger.

11 Claims, 4 Drawing Sheets

(56) References Cited

U.S. PATENT DOCUMENTS

| | | |
|---|---|---|
| 7,258,300 B2 | 8/2007 | Rösch |
| 2002/0114693 A1 | 8/2002 | Bartholoma et al. |

FOREIGN PATENT DOCUMENTS

| | | |
|---|---|---|
| DE | 4205322 A1 | 8/1993 |
| DE | 29507152 U1 | 7/1995 |
| DE | 10224839 A1 | 1/2004 |
| DE | 60020158 T2 | 1/2006 |
| DE | 102004033884 A1 | 2/2006 |
| DE | 102004044703 A1 | 3/2006 |
| DE | 102007001799 A1 | 12/2007 |
| EP | 0898139 A2 | 2/1999 |
| EP | 1233190 A1 | 8/2002 |
| JP | 5338696 A | 12/1993 |
| JP | 2003519309 A | 6/2003 |
| JP | 2004144114 A | 5/2004 |
| JP | 2004270472 A | 9/2004 |
| JP | 2007232202 A | 9/2007 |
| WO | 0143908 A1 | 6/2001 |

* cited by examiner

SECURING ELEMENT AND EXHAUST GAS TURBOCHARGER HAVING VARIABLE TURBINE GEOMETRY

BACKGROUND OF THE INVENTION

Field of the Invention

The invention relates to a securing element, in particular for an exhaust gas turbocharger having variable turbine geometry, as well as an exhaust gas turbocharger having variable turbine geometry with such a securing element.

Although the motivation and the idea of the present invention are explained below using as example a fastening screw to secure the guide vane arrangement of an exhaust gas turbocharger having variable turbine geometry (VTG), the invention is not limited to such a fastening screw and also not to the use of the fastening screw to secure the guide vane arrangement in the case of such an exhaust gas turbocharger.

Exhaust gas turbochargers having variable turbine geometry, compared with exhaust gas turbochargers having fixed turbine geometry, have the advantage that the intake cross-section, under which the hot exhaust gases are conducted to the turbine wheel of the exhaust gas turbocharger, can be adjusted by means of an adjustable guide apparatus. By means of this measure, the dynamics of the build up of the charging pressure can be adapted practically optimally to the relevant engine operating point.

The German patent application DE 10 2004 033 884 A1 discloses such an exhaust gas turbocharger having variable turbine geometry. The variable turbine geometry is in this case implemented by means of a guide vane arrangement that can be adjusted. This guide vane arrangement consists of a ring of guide vanes of variable alignment, which is arranged in a narrow area between the exhaust gas inlet channel of the turbine and the turbine rotor referred to as the vane chamber.

The guide vanes are supported on a supporting ring in a pivotable manner, with the guide vanes of the guide vane arrangement being adjusted by means of an adjusting ring.

In addition, the publication mentioned describes how this assembly, referred to as the VTG-guide vane arrangement below, consisting of the supporting ring, of a plurality of spacer tubes and of a further, circular component referred to as a flange section, is secured by means of screws to the bearing housing of the exhaust gas turbocharger.

As a result of the fact that the supporting ring and the flange section are directly exposed to the hot exhaust gas flows and thus have a higher temperature than the housing component and because the materials used have a higher coefficient of thermal expansion than the housing component, the supporting ring and the flange section exhibit a higher temperature-related expansion than the housing component during operation.

Because of the subsequent uneven temperature-related expansion of the components braced with one another, every single screw is then subjected to an undesired shearing stress in the radial direction. In addition, the transverse forces introduced result in bending torques which lead to bending stresses in the screw. The bending stress profile introduced in the screw is undesirably very irregular. Because the screw-in point in the housing component and the area of the screw head act as fixed fixing points, there are very high bending stresses there, whereas the areas of the screw shaft lying in between are only insignificantly subjected to bending.

During non-steady-state operation of the turbocharger with alternating exhaust gas temperatures or exhaust gas throughputs, a variable bending stress also sets in in the screw. Because of this, the screw shows a tendency, in particular in the highly strained areas at the screw-in point and at the screw head, to embrittlement and to plastification, which results in a loss of the initial stressing force in the screw or in the worst-case scenario, a fatigue failure of the screw. In the case of a loss of the initial stress in the force of the screw, the dimensional stability of the VTG-guide vane arrangement is no longer guaranteed. The play of the guide vanes in the vane chamber increases, so that increased flow losses occur at the guide vanes, which can have an adverse effect on the total efficiency of the exhaust gas turbocharger. Because of the loss of the initial stressing force in the screw, the danger exists that the screws can work loose completely because of vibrations, eventually resulting in a total failure of the VTG-guide vane arrangement. A fatigue failure of the screws results in the immediate total failure of the VTG-guide vane arrangement.

BRIEF SUMMARY OF THE INVENTION

The object underlying the present invention is thus to create an improved securing element, in particular for an exhaust gas turbocharger having variable turbine geometry.

The object of the present invention is achieved by a securing element as well as an exhaust gas turbocharger having variable turbine geometry with the features described below.

Accordingly provision has been made for a securing element, comprising a head section, a shank, the cross-section of said shank changing in the axial direction such that, by taking into account a qualitative and/or quantitative predetermined bending torque profile in the shank, the cross-section has an essentially uniform bending stress profile in the shank in relation to a securing element with a constant shank cross-section.

In addition, provision has also been made for an exhaust gas turbocharger having variable turbine geometry, with at least one housing component, which has at least one connecting point for the connection of such a securing element, with an adjustable VTG-guide vane arrangement in order to change the turbine flow cross-section, which has at least one recess with at least such a securing element to secure the VTG-guide vane arrangement to the housing component, with the securing element being secured by the recess of the VTG-guide vane arrangement right through to the connecting point of the housing component.

The underlying idea of the present invention is to make provision for a securing element with a shank, which is adapted to the bending torque profile in the shank, so that a steady material stress sets in in the shank of the securing element as a result of bending stresses. For this purpose, the securing element in accordance with the invention has a shank with the cross-section of said shank changing in the axial direction. The bending resistance torque of the shank is adapted at each point of the shank to the bending torque present there so that a uniform distribution of the bending stress occurs in the shank of the securing element.

A further idea of the present invention consists of securing a VTG-guide vane arrangement in accordance with the invention by means of a securing element to a housing component of an exhaust gas turbocharger having variable turbine geometry. Because of this, the temperature-related expansion of the bending stresses caused by the VTG-guide vane arrangement in the securing element is evened out. By preventing locally excessive bending stresses in the securing element, the danger of a plastification and embrittlement of the securing element is reduced. As a result, the probability of a component failure in the securing element is greatly decreased, which on the other hand results in a higher operating safety of the VTG-guide vane arrangement and the turbocharger as a whole.

Advantageous developments and further embodiments of the invention form the subject matter of the subclaims as well as the description which refer to the drawings.

In an embodiment in accordance with the invention, the shank of the securing element has a narrowed cross-section at one point or at a plurality of points. As a result, a local drop in the bending torque profile in the shank is compensated for so that a constant bending stress profile is introduced.

In an embodiment in accordance with the invention, the shank of the securing element has a locally thickened cross-section at one point or at a plurality of points. As a result, a locally excessive increase in the bending torque profile is compensated for so that a constant bending stress profile in the shank is introduced.

In an embodiment in accordance with the invention, the shank of the securing element has a thread, in order to be able to screw the securing element into a further component or to be able to screw a further securing element, such as for example a nut, onto the securing element in accordance with the invention.

In a further embodiment in accordance with the invention, the head section of the securing element is embodied as a screw head formed onto it.

In a further embodiment in accordance with the invention, the head section of the securing element is embodied as a nut, which is screwed onto the shank of the securing element.

A securing element in accordance with the invention can also be made of a machining steel, of a cold headed steel, of a cold extruded steel, of a general construction steel or of a heat-treatable steel. In order to be able to be used in a hot environment such as for example in an exhaust gas turbocharger, the securing element in accordance with the invention is made of a high-temperature austenitic steel in a preferred embodiment. In a particularly preferred embodiment of the invention, the securing element is made of a super alloy on an iron, a nickel, a platinum, a chrome and/or a cobalt basis. The use of such a super alloy, allows the application of the securing element in exceptionally hot ambiences such as for example in an exhaust gas turbocharger. The following materials, i.e. Stellite, Tribaloy, Hastelloy, Incoloy, Inconel, Nimonic and R88DT are examples of such super alloys.

In the case of shank-shaped securing elements, the securing element in accordance with the invention can be produced by means of cold forming or by means of hot forming. Because of the fact that the shank cross-section of a securing element in accordance with the invention varies strongly under circumstances, the securing element in accordance with the invention is produced in a preferred embodiment by means of turning. By means of a securing element produced in such a way, more complex shank geometries can be made. In a particularly preferred embodiment of the present invention, the securing element is produced by means of grinding. Such a securing element is also particularly advantageous, because on the one hand complex shank geometries are made as well as on the other hand stringent production tolerances can be fulfilled.

In an embodiment in accordance with the invention of the exhaust gas turbocharger having variable turbine geometry, the securing element in accordance with the invention is screwed into the connecting point to the housing component of the exhaust gas turbocharger. By means of such a connection of the securing element to the housing component of the turbocharger, a reliable securing of the VTG-guide vane arrangement to the housing component of the exhaust gas turbocharger can be implemented in a particularly easy manner. To this end, as an alternative, a securing element in accordance with the invention can also for example be pressed into the connecting point at the housing component or be secured by means of a soldered or a welded joint to the connecting point.

In a preferred embodiment of the inventive exhaust gas turbocharger, provision has been made in sections for a radial play between the shank of the securing element and the recess of the VTG-guide vane arrangement. By means of the radial play, an undesired introduction of load in the shank of the securing element can be prevented. In particular, in the area of the connecting point of the housing component, an unfavorable shearing stress of the shank of the securing element can be prevented as a result of such a radial play. Because of this, the danger of a plastification and embrittlement of the shank as a result of the strong curvature of the shank caused by the shear in the area of the connecting point are prevented.

In a preferred embodiment of the inventive exhaust gas turbocharger, the shank of the securing element is directly in sections against the wall of the recess of the VTG-guide vane arrangement. Because of this, in particular in the area of the head section of the securing element, a load can be introduced locally in the shank of the securing element. A further advantage of such a configuration consists in that single components of the VTG-guide vane arrangement can be supported on the shank of the securing element.

In a typical embodiment of a turbocharger in accordance with the invention, the housing component, to which the VTG-guide vane arrangement is secured by means of a securing element in accordance with the invention, is the bearing housing of the exhaust gas turbocharger. In an alternate typical embodiment of the inventive exhaust gas turbocharger, the housing component, to which the VTG-guide vane arrangement is secured by means of the securing element in accordance with the invention, is the turbine housing of the exhaust gas turbocharger.

In a further typical embodiment of an inventive exhaust gas turbocharger, the VTG-guide vane arrangement, which is secured to the housing component of the exhaust gas turbocharger by means of a securing element in accordance with the invention, at least comprises one supporting ring and a plurality of VTG-guide vanes, which are supported on the supporting ring in a pivotable manner.

In a preferred embodiment of an inventive exhaust gas turbocharger, the VTG-guide vane arrangement comprises two supporting rings, with the VTG-guide vanes being arranged like a sandwich between a first supporting ring and a second supporting ring and being supported on the first supporting ring and on the second supporting ring in a pivotable manner. Compared with the embedding of the VTG-guide vane with only one supporting ring, such a two-sided embedding of the VTG-guide vanes has the advantage of a greater bearing support width.

In a further, typical embodiment of an inventive exhaust gas turbocharger, the VTG-guide vane arrangement comprises one spacer or a plurality of spacers, which in the assembled state, can guarantee the free mobility of the VTG-guide vanes. Such spacers keep the tensile force introduced by the securing element in the VTG-guide vane arrangement away from the VTG-guide vanes, so that their pivotability is retained even in the assembled state.

In a further, typical embodiment of an inventive exhaust gas turbocharger, the VTG-guide vane arrangement has an adjusting ring in order to change the position of the VTG-guide vanes. The VTG-guide vanes are adjusted by means of twisting this adjusting ring attached in a parallel manner and in a coaxial manner to a supporting ring. In order to ensure the twistability of the adjusting ring, it is not subjected to the tensile force introduced in the assembled state by the securing element in the VTG-guide vane arrangement.

In a further preferred embodiment of an inventive exhaust gas turbocharger, the VTG-guide vane arrangement has one roller element or a plurality of roller elements, on which the adjusting ring is supported in a pivotable manner in order to adjust the VTG-guide vanes. By using such roller elements, an easy twistability of the adjusting ring is guaranteed.

In a further, preferred embodiment of an inventive exhaust gas turbocharger, the VTG-guide vane arrangement has a distance piece, which in the assembled state fits closely to the housing component of the exhaust gas turbocharger and which is subjected to the tensile force introduced by the securing element in accordance with the invention in the VTG-guide vane arrangement. Such a distance piece has the advantage that the remaining components of the VTG-guide vane arrangement can be fitted at a distance defined from the housing component. In particular, such a distance piece prevents the particularly harmful shearing of the shank of the securing element in the area of the connecting point of the housing component as a result of the temperature-determined expansion of a hot supporting ring.

BRIEF DESCRIPTION OF THE SEVERAL VIEWS OF THE DRAWING

The invention is described in more detail below with reference to the exemplary embodiments specified in the schematic figures of the drawing, in which.

DESCRIPTION OF THE INVENTION

In all figures of the drawings, the same reference signs refer to the same or functionally comparable components unless stated to the contrary.

Figure 1:
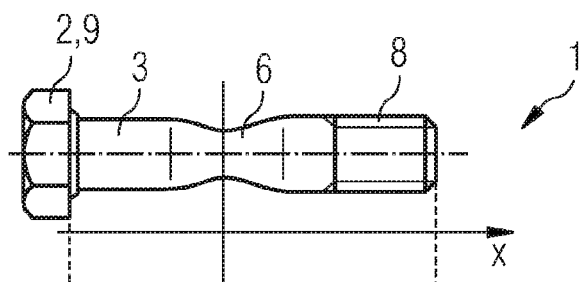
FIG. 1 shows a side view of a first exemplary embodiment of a securing element in accordance with the invention.

FIG. 1 shows a side view of a first exemplary embodiment of a securing element 1 in accordance with the invention. The securing element 1 has a head section 2 as well as a shank 3. The head section 2 is embodied here as a screw head 9 formed as one part to the securing element. The shank 3 of the securing element 1 has a thread 8 on the opposite side of the head section 2. The shank 3 of the securing element 1 for example has a local narrowing 6.

Figure 1A:
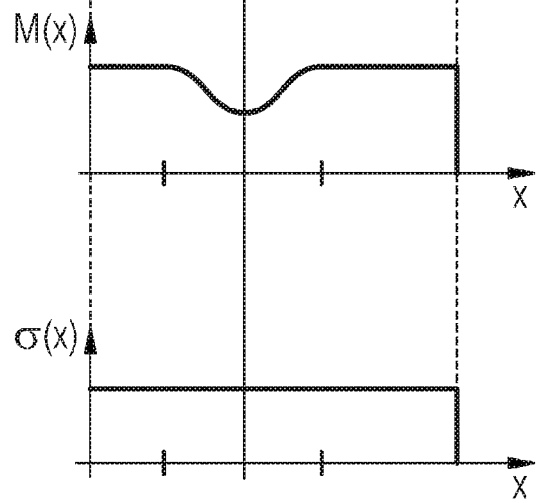
FIG. 1a shows a graphic representation of the bending torque profile in the first exemplary embodiment of a securing element in accordance with the invention.

FIG. 1a shows a graphic representation of the bending torque profile M(x) in the first exemplary embodiment of a securing element in accordance with the invention. The bending torque profile M(x) is shown as a function of the longitudinal coordinate x of the shank 3.

Figure 1B:
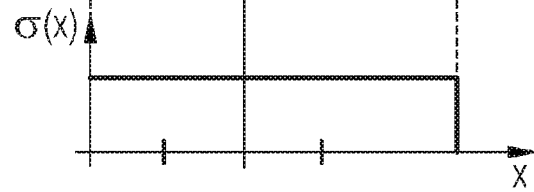
FIG. 1b shows a graphic representation of the bending stress profile in the first exemplary embodiment of a securing element in accordance with the invention.

FIG. 1b shows a graphic representation of the bending stress profile σ(x) in the first exemplary embodiment of a securing element 1 in accordance with the invention. The bending stress profile σ(x) is shown as a function of the longitudinal coordinate x of the shank 3. In this case, the bending stress profile σ(x) is to be understood as the bending stress profile σ(x) setting in at the maximum distance from the neutral thread of the shank 3.

As the overall view of FIGS. 1, 1a and 1b shows, the local narrowing 6 of the shank 3 is embodied in such a way that with due consideration of the local drop in the bending torque profile M(x) shown in FIG. 1a, the constant bending stress profile σ(x) shown in FIG. 1b sets in in the shank 3 of the securing element 1.

Figure 2:
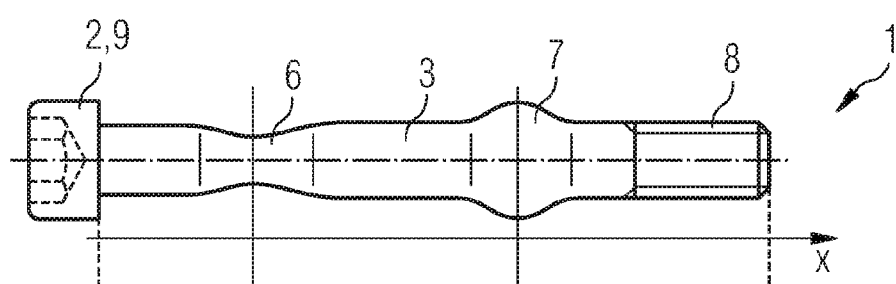
FIG. 2 shows a side view of a second exemplary embodiment of a securing element in accordance with the invention.

FIG. 2 shows a side view of a second exemplary embodiment of a securing element 1 in accordance with the invention. Unlike the screw head 9 shown in FIG. 1, the screw head 9 used in this case has an internal hexagon instead of an external hexagon. In addition, the securing element 1 distinguishes itself here in that the shank 3 of the securing element 1 also has a local narrowing 6 as well as a local thickening 7.

Figure 2A:
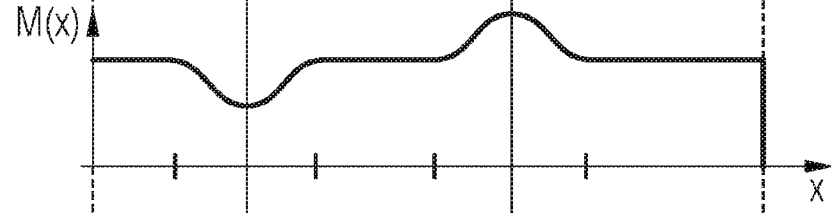
FIG. 2a shows a graphic representation of the bending torque profile in the second exemplary embodiment of a securing element in accordance with the invention.

FIG. 2a shows a graphic representation of the bending torque profile M(x) in the second exemplary embodiment of a securing element in accordance with the invention.

Figure 2B:
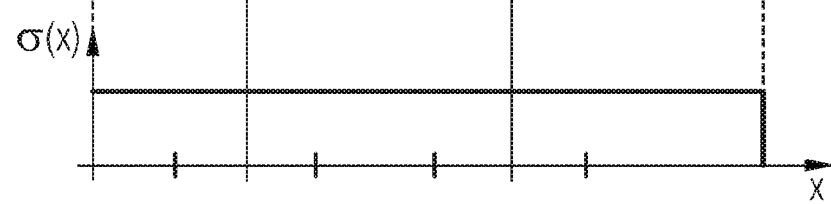
FIG. 2b shows a graphic representation of the bending stress profile in the second exemplary embodiment of a securing element in accordance with the invention.

FIG. 2b shows a graphic representation of the bending stress profile σ(x) in the second exemplary embodiment of a securing element 1 in accordance with the invention. In this case, the bending stress profile σ(x) is to be understood as the bending stress profile σ(x) setting in at the maximum distance from the neutral thread of the shank 3.

As the overall view of FIGS. 2, 2a and 2b shows, the local narrowing 6 or the local thickening 7 of the shank 3 of the securing element 1 is embodied in such a way that, taking into account the local trough or the local peak of the bending torque profile M(x) in the shank 3 of the securing element 1 shown in FIG. 2a, the constant bending stress profile σ(x) shown in FIG. 2b sets in.

The securing elements 1 shown in FIGS. 1 and 2 are for example made of a machining steel, a cold headed steel or of a cold extruded steel. In order to be used in a hot environment, they are preferably made of a high-temperature austenitic steel and for use in a particularly hot environment; they are ideally made of a super alloy.

The securing elements 1 are for example produced by means of cold forming or by means of hot forming. In order to implement more complex shank geometries of the securing element 1, these can be produced by means of turning in a preferred manner. In order to implement more complex shank geometries while at the same time adhering to stringent production tolerances, the securing elements 1 in accordance with the invention can be produced by means of grinding in a preferred manner.

Figure 3:
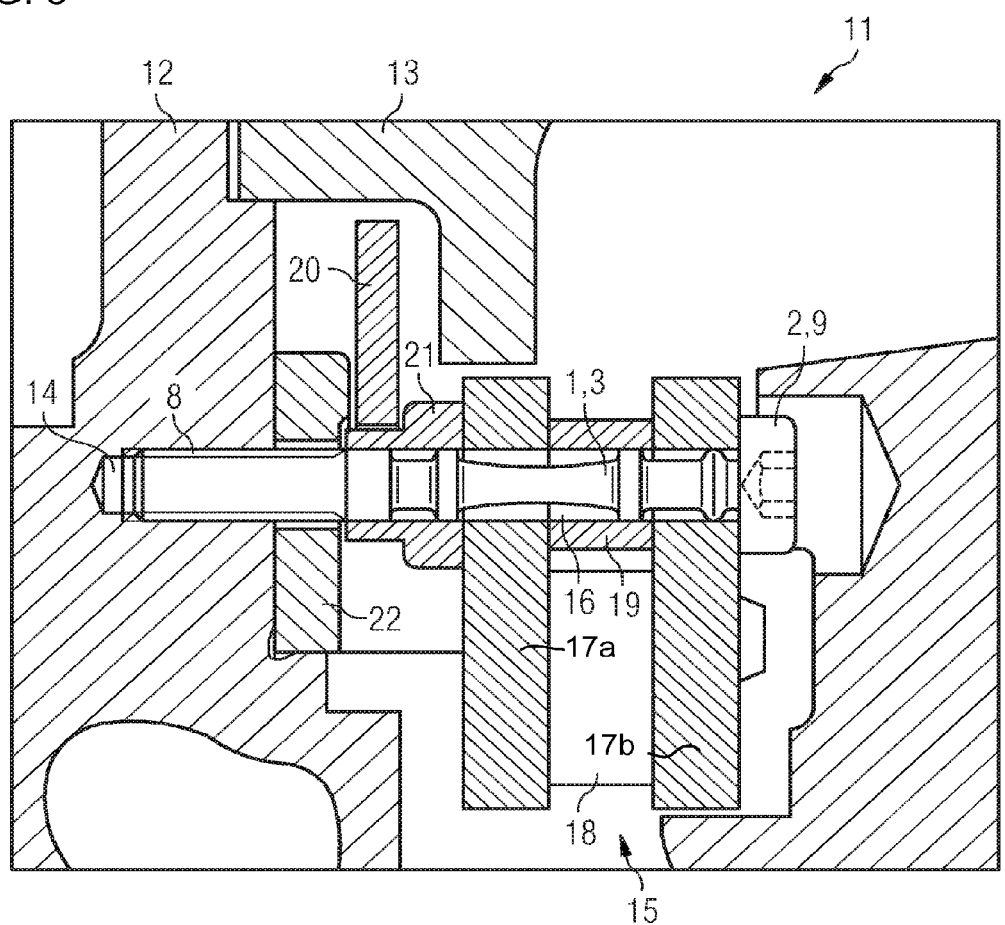
FIG. 3 shows a partial sectional view of a first exemplary embodiment of an inventive exhaust gas turbocharger.

FIG. 3 shows a part view of a first exemplary embodiment of an exhaust gas turbocharger 11 in accordance with the invention. As is shown by way of example in FIG. 3, a VTG-guide vane arrangement 15 arranged between the bearing housing 12 and the turbine housing 13 is secured to the bearing housing 12 of the exhaust gas turbocharger 11 having variable turbine geometry by means of an inventive securing element 1. For this purpose, the securing element 1 in accordance with the invention embodied with a screw head 9 is secured by means of a recess 16 of the VTG-guide vane arrangement 15 through the connecting point 14 of the bearing housing 12. The shank 3 of the shown securing element 1 has a thread 8 on the opposite side of the screw head 9. The securing element 1 is screwed into the connecting point 14 of the bearing housing 12 by means of said thread 8.

The components forming the VTG-guide vane arrangement 15 shown by way of example are subsequently described below:

The VTG-guide vane arrangement 15 between the connecting point 14 of the bearing housing 12 and the head section 2 of the securing element 1 has the following components through which the securing element 1 passes: namely, a spacer 22, a roller element 21, a first supporting ring 17a, a spacer 19 and a second supporting ring 17b. In addition to this, one VTG-guide vane of a plurality of VTG-guide vanes 18 is shown, which are supported between the two supporting rings 17a and 17b in a pivotable manner. Over and above that, the VTG-guide vane arrangement 15 has an adjusting ring 20 in order to adjust the VTG-guide vanes 18, which are supported on the roller element 21 shown in a pivotable manner. The roller element 21 is itself supported on the securing element 1 in a pivotable manner while the shank 3 of the securing element 1 lies against the wall of the recess 16 of the roller element 21. In addition, for the radial mounting of the spacer 19, the shank 3 of the securing element 1 lies against the wall of the recess 16 of the spacer 19. In order to introduce the transverse forces resulting from the thermal expansion of the supporting rings 17a and 17b in the longest possible distance from the receiving point 14 in the bearing housing 12 in the shank 3 of the securing element 1, provision has been made for a radial play between the shank 3 of the securing element 1 and the recess of the first supporting ring 17a, while the shank 3 of the securing element 1 lies against the wall of the recess 16 of the second supporting ring 17b. In order to prevent an undesired and with regard to the durability of the securing element 1, a harmful shearing stress in the area of the connecting point 14 at the bearing housing 12, provision has been made for a radial play between the shank 3 of the securing element 1 and the recess 16 of the spacer 22. As explained above, the securing element 1 in accordance with the invention has a shank 3 with a cross-section changing in the axial direction in order to even out the bending stresses in the shank 3 of the securing element 1.

Figure 4:
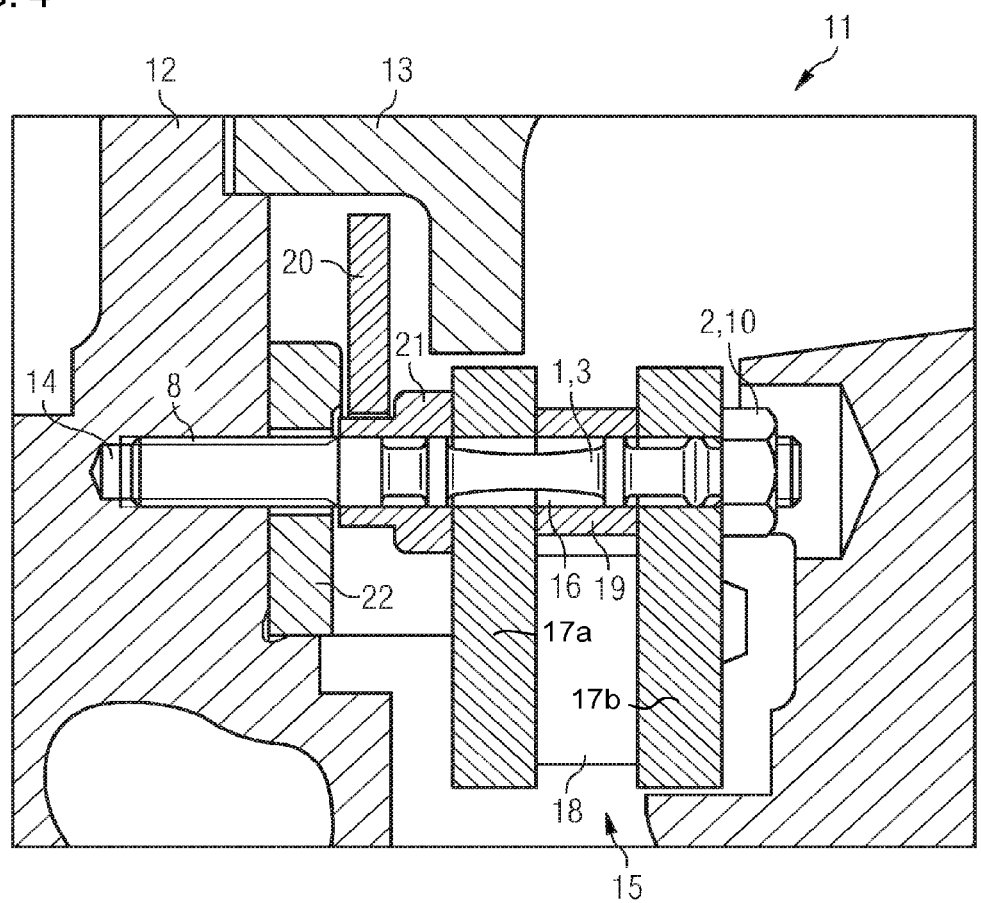
FIG. 4 shows a partial sectional view of a second exemplary embodiment of an inventive exhaust gas turbocharger.

FIG. 4 shows a part sectional view of a second exemplary embodiment of an inventive exhaust gas turbocharger 11. The VTG-guide vane arrangement 15 does not differ in its structure from the VTG-guide vane arrangement 15 shown in FIG. 3. On the other hand, the guide vane arrangement 15 is secured to a connecting point 14 of the bearing housing 12 by means of an inventive securing element 1. The shank 3 of the securing element 1 shown has—in the same way as in the exemplary embodiment shown in FIG. 3—a thread 8 on the opposite side of the head section 2 of the securing element 1. The securing element 1 is screwed into the connecting point 14 of the bearing housing 12 by means of said thread 8. Unlike the exemplary embodiment shown in FIG. 3, the head section 2 of the securing element 1 shown as an example is embodied as a nut 10, which is screwed onto the shank 3 of the securing element 1.

Figure 5:
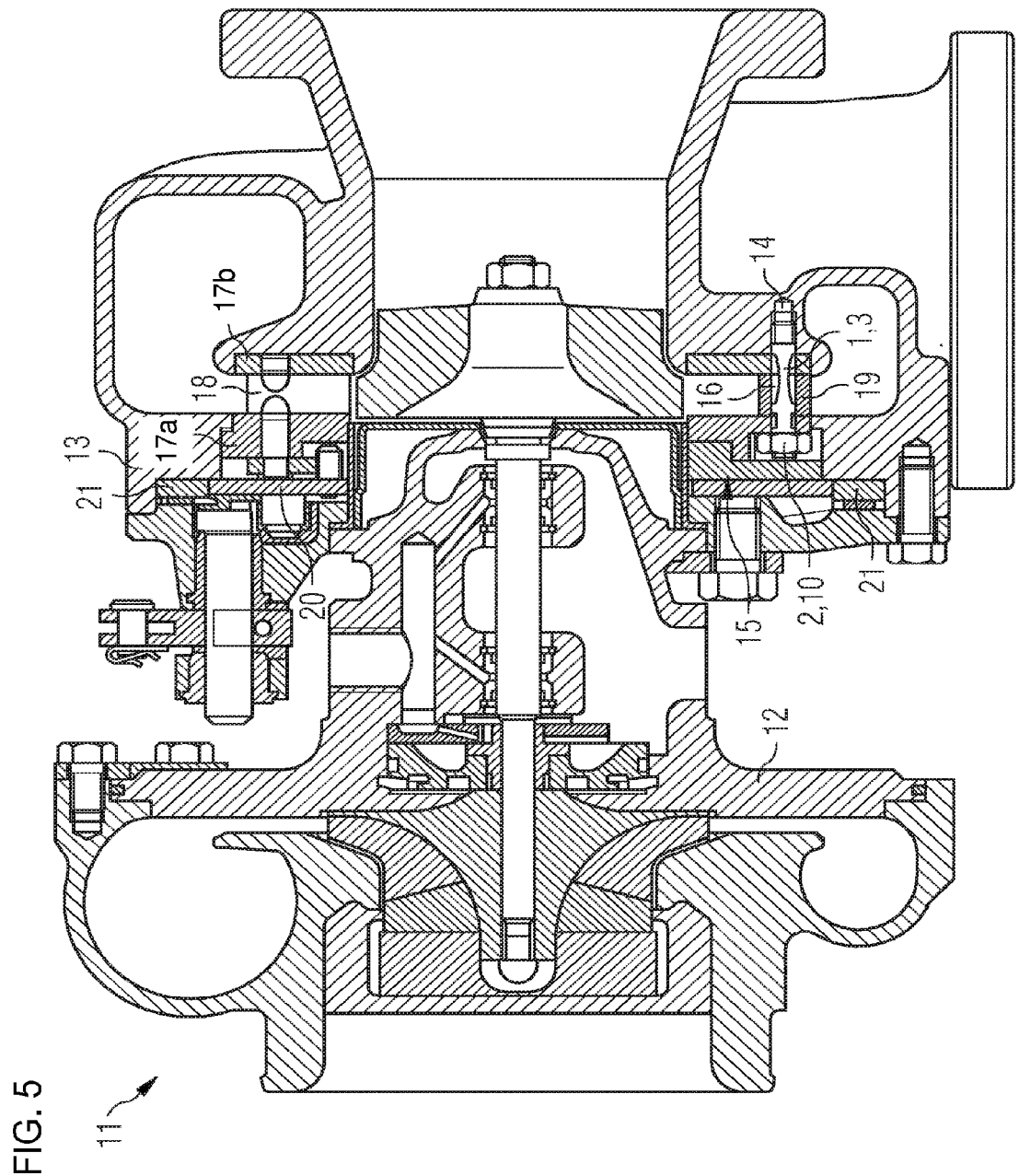
FIG. 5 shows a sectional view of a third exemplary embodiment of an inventive exhaust gas turbocharger.

FIG. 5 shows a sectional view of a third exemplary embodiment of an inventive exhaust gas turbocharger 11. Contrary to the exemplary embodiments thus far, the VTG-guide vane arrangement 15 shown in the exhaust gas turbocharger 11 is not secured to the bearing housing 12, but to the turbine housing 13. The VTG-guide vane arrangement 15 shows the following components lying between the connecting point 14 of the turbine housing 13 and the head section 2 of the securing element 1 and penetrated by the securing element 1: namely, a first supporting ring 17a, a spacer 19 and a second supporting ring 17b. In addition, the VTG-guide vane arrangement 15 has the VTG-guide vanes 18, which are supported between the first supporting ring 17a and the second supporting ring 17b in a pivotable manner. In addition, the VTG-guide vane arrangement 15 has an adjusting ring 20 in order to adjust the position of the VTG-guide vanes 18. In order to guarantee the twistability of the adjusting ring 20, it can ride on roller elements 21, which are supported in the turbine housing 13 of the exhaust gas turbocharger 11. The head section 2 of the shown securing element 1 is embodied as a nut 10, which is screwed onto the shank 3 of the securing element 1. In order to prevent a shearing stress in the vicinity of the connecting point 14 in the turbine housing 13, provision has been made for a radial play between the shank 3 of the securing element 1 and the wall of the recess 16 of the first supporting ring 17a. In order to introduce the transverse forces resulting from the thermal expansion of the first and second rings 17a and 17b in the longest possible distance from the connecting point 14 in the turbine housing 13 in the shank 3 of the securing element 1, the shank 3 lies immediately against the wall of the recess 16 of the second supporting ring 17b. In order to secure the spacer 19 in a radial direction, the shank 3 of the securing element 1 lies against the wall of the recess 16 of the spacer 19. The shank 3 of the inventive securing element 1 has a cross-section changing in the axial direction of the shank 3, in order to even out the bending stress profile in the shank 3 of the securing element 1.

Although the present invention was described above by means of preferred exemplary embodiments, it is not limited thereto, but can be modified in a plurality of ways and manners.

Therefore, the invention should not be limited to the special structure of the securing elements shown in the above figures. These securing elements can rather be modified in any way and manner without deviating from the underlying principle of the invention.

In particular, the shank of a securing element in accordance with the invention does not necessarily have to be embodied circular. The principle on which the securing element in accordance with the invention is based can also for example be implemented by using an oval, a square or a multi-sided shank cross-section. In addition, it is feasible for the geometrical basic form of the shank cross-section to change in the axial direction to the shank. A securing element in accordance with the invention could for example have a circular shank cross-section close to the head section and an angular shank cross-section on the opposite side of the head section.

It goes without saying that the head section of an inventive securing element can be made in numerous ways. If the head section of the securing element is embodied as a screw head formed onto the securing element, this screw head can for example be embodied as a hexagonal screw head, as a cylindrical screw head, as a countersunk screw head, as a round screw head, as a cheese head screw or even as an internal hexagonal head screw. If the head section of the securing element is embodied as a nut screwed onto the securing element, this nut can for example be embodied as a normal hexagonal nut, as a cap nut, as a nut for a keyed end, as a wing nut, as a slotted nut, as a hexagonal weld nut, as a cross-hole nut, as a hexagonal nut with a spigot or as a dome nut. The head section of a securing element in accordance with the invention can consequently be formed in one part in any way with the securing element or as a separate component, as long as the head sections of the securing element are suitable for transmitting axial clamping forces in the securing element.

The exemplary embodiments shown in this case for the exhaust gas turbocharger having variable turbine geometry must naturally be understood as illustrative exemplary embodiments. It is self-evident that the VTG-guide vane arrangement in an inventive exhaust gas turbocharger can deviate considerably from the designs shown in the exemplary embodiments. The concept of the VTG-guide vane arrangement is to be understood as in quite general terms here as an assembly which includes the VTG-guide vanes of variable alignment as well as an adjusting mechanism for changing the alignment of said VTG-guide vanes.

The securing of a VTG-guide vane arrangement to a housing component of an inventive exhaust gas turbocharger can naturally be undertaken with one securing element or with any number of securing elements in accordance with the invention. As already shown in the exemplary embodiments, the securing elements in accordance with the invention must for this purpose not necessarily pass through all the components of the VTG-guide vane arrangement.

Although the present invention was explained by using a securing element for securing a VTG-guide vane arrangement to a housing component of an exhaust gas turbocharger as an example, it is self-evident that the applicability of a securing element in accordance with the invention is not limited to an exhaust gas turbocharger. A securing element in accordance with the invention can instead be used wherever where it is useful to even out the bending stress profile in a shank-shaped securing element.

The invention claimed is:

1. An exhaust gas turbocharger having variable turbine geometry, the exhaust gas turbocharger comprising:
    at least one housing component having at least one connecting point;
    an adjustable VTG-guide vane configuration for changing a turbine flow cross-section, said adjustable VTG-guide vane configuration having at least one recess; and
    at least one securing element for securing said VTG-guide vane configuration to said at least one housing component, said securing element including a head section, a thread section, and a shank having an axial direction and a cross-section changing in said axial direction;
    said cross-section of said shank configured with said changing cross-section causing said cross-section to have a substantially uniform bending stress profile in said shank as compared to a securing element with a constant shank cross-section, by taking a qualitative and/or quantitative predetermined bending torque profile in said shank into account;
    said securing element being secured in said recess of said VTG-guide vane configuration through to said connecting point of said at least one housing component;
    said shank of said securing element having a narrowed portion being narrowed compared to said thread section, and said adjustable VTG-guide vane configuration having at least one guide vane mounted to pivot about said narrowed portion of said shank of said securing element.

2. The exhaust gas turbocharger according to claim 1, wherein said securing element is screwed in into said connecting point.

3. The exhaust gas turbocharger according to claim 1, which further comprises a radial play between said shank and said recess of said VTG-guide vane configuration, at least in vicinity of said connecting point, to prevent an introduction of load into said shank.

4. The exhaust gas turbocharger according to claim 1, wherein said shank lies against a wall of said recess of said VTG-guide vane configuration, at least in vicinity of said head section of said securing element, for introducing load into said shank and/or for a radial embedding of components of said VTG-guide vane configuration on said shank.

5. The exhaust gas turbocharger according to claim 1, wherein said at least one housing component is a bearing housing or a turbine housing of the exhaust gas turbocharger.

6. The exhaust gas turbocharger according to claim 1, wherein said VTG-guide vane configuration has at least one supporting ring and a plurality of VTG-guide vanes, said VTG-guide vanes being pivotably supported in said at least one supporting ring.

7. The exhaust gas turbocharger according to claim 6, wherein said VTG-guide vane configuration has at least one spacer lying against said at least one supporting ring for guaranteeing free mobility of said VTG-guide vanes in an assembled state.

8. The exhaust gas turbocharger according to claim 6, wherein said VTG-guide vane configuration has at least one adjusting ring for changing a position of said VTG-guide vanes.

9. The exhaust gas turbocharger according to claim 8, wherein said VTG-guide vane configuration has at least one roller element on which said adjusting ring is pivotably supported to adjust said VTG-guide vanes.

10. The exhaust gas turbocharger according to claim 1, wherein said VTG-guide vane configuration has at least first and second supporting rings and VTG-guide vanes sandwiched between said first supporting ring and said second supporting ring and pivotably supported in said first supporting ring and in said second supporting ring.

11. The exhaust gas turbocharger according to claim 1, wherein said VTG-guide vane configuration has at least one spacer lying against said at least one housing component in an assembled state and spacing remaining components of said VTG-guide vane configuration at a distance from said at least one housing component.

* * * * *